United States Patent [19]

Ilzig et al.

[11] Patent Number: 5,665,901
[45] Date of Patent: Sep. 9, 1997

[54] SHOCK ABSORBER TESTING DEVICE

[75] Inventors: Frank Ilzig, Schweinfurt; Norbert Omlor, Bergtheim, both of Germany

[73] Assignee: Fichtel & Sachs AG, Schweinfurt, Germany

[21] Appl. No.: 655,763

[22] Filed: May 30, 1996

[30] Foreign Application Priority Data

May 30, 1995 [DE] Germany ........................ 195 19 136.6

[51] Int. Cl.$^6$ ................................................ G01M 17/04
[52] U.S. Cl. ................................... 73/11.08; 73/669
[58] Field of Search ........................... 73/11.07, 11.08, 73/669

[56] References Cited

U.S. PATENT DOCUMENTS

| 4,589,273 | 5/1986 | Tamasi et al. | 73/11.08 |
| 4,703,645 | 11/1987 | Hudacsek et al. | |
| 5,259,246 | 11/1993 | Stuyts. | |

FOREIGN PATENT DOCUMENTS

| 0049303 | 4/1982 | European Pat. Off. . |
| 0142135 | 5/1985 | European Pat. Off. . |
| 3831885 | 3/1990 | Germany . |
| 9303201 | 8/1993 | Germany . |

*Primary Examiner*—Robert Raevis
*Attorney, Agent, or Firm*—Nils H. Ljungman and Associates

[57] ABSTRACT

At least one adjustable drive unit for a wheel support which can be set in oscillation, and electronic units which measure and evaluate the oscillating movement of the suspended vehicle with the following process steps:

Acceleration of the wheel support by the drive unit to an oscillation measurement point A in an oscillation range above the resonance frequency of the wheel, and maintenance of the wheel support in this oscillating condition, until at measurement point B, the wheel has matched the oscillations of the wheel support with sufficient accuracy;

A delayed reduction of the oscillation frequency with simultaneous measurement and storage of the oscillation amplitude to a reverse oscillation frequency at measurement point C, at which, during the reduction of the oscillation frequency, the oscillation amplitude has fallen below a first limit value which is considered an indicator of the faded, or decayed, resonance frequency;

An increase in the oscillation frequency with simultaneous measurement and storage of the oscillation amplitude to a measurement point D, at which the oscillation amplitude has fallen below a second limit value which serves as an indicator for a faded resonance frequency;

A deceleration of the oscillation movement of the wheel support unit it comes to a standstill; and A comparative measurement of the oscillation amplitude measured between measurement points C and D with an oscillation amplitude of a reference shock absorber.

20 Claims, 3 Drawing Sheets

1

SHOCK ABSORBER TESTING DEVICE

BACKGROUND OF THE INVENTION

1. Field of the Invention

The present invention relates to a process for testing the performance of a shock absorber by means of a shock absorber testing device.

2. Background Information

Shock absorbers are of great importance, not only for driving comfort, but also for driving safety. They must provide good road hugging ability of the wheels, and thus correct road holding characteristics of the vehicles. Good road holding characteristics can only be guaranteed when the vehicle is equipped with properly operating shock absorbers. Since the shock absorbers are constantly exposed to high stresses, they must also be checked after a certain period to make certain that they are still operating correctly.

The most precise method for testing the performance of shock absorbers is a measurement performed on a special test machine, of the type used by the Development and Quality Assurance Departments of companies in the motor vehicle industry. These machines can be used to check the overall damping force characteristics of a shock absorber. But these special machines are very expensive, and are therefore unprofitable to operate, even for large motor vehicle maintenance operations or dealers. Furthermore, the shock absorbers can also be tested on such a machine only after they have been removed from the vehicle.

Makeshift measures are frequently employed by mechanics, such as the rocking of the vehicle body or a test drive. But the ease with which these tests can be performed is offset by a significant risk of inaccuracy and uncertainty in the results.

One shock absorber testing device is disclosed in German Utility Model No. 93 03 201. On this shock absorber testing device, the condition of the individual shock absorbers is determined by means of a comparative measurement. The vehicle is parked with one vehicle axle on a wheel support which can be placed in oscillation. An unregulated drive unit in connection with a cam excites the wheel support to a supercritical oscillation frequency of approximately 15 Hz. The drive unit is then turned off, whereby the wheel support during the damped fading, or decay, movement automatically runs through the resonance range, making it possible to evaluate the condition of the shock absorber. In this test method, conclusions are drawn from the overall oscillating behavior of the chassis concerning the effectiveness of the shock absorber and the operating condition of the overall chassis.

OBJECT OF THE INVENTION

One object of the present invention is to improve the comparative measurement process of shock absorber testing devices with regard to the accuracy and reliability of the measurement.

SUMMARY OF THE INVENTION

The present invention teaches that this object can be accomplished by means of a shock absorber testing device which includes at least one adjustable drive unit for a wheel support which can be set in oscillation, and electronic units which measure and evaluate the oscillating movement of the suspended vehicle with the following process steps:

Acceleration of the wheel support by the drive unit to an oscillation measurement point A in an oscillation range above the resonance frequency of the wheel, and maintenance of the wheel support in this oscillating condition, until at measurement point B, the wheel has matched the oscillation frequency of the wheel support with sufficient accuracy;

A delayed reduction of the oscillation frequency with simultaneous measurement and storage of the oscillation amplitude to a reverse oscillation frequency at measurement point C, at which, during the reduction of the oscillation frequency, the oscillation amplitude has fallen below a first limit value which is considered an indicator for the faded, or decayed, resonance frequency;

An increase in the oscillation frequency with simultaneous measurement and storage of the oscillation amplitude to a measurement point D, at which the oscillation amplitude has fallen below a second limit value which serves as an indicator for a faded, or decayed, resonance frequency;

A deceleration of the oscillation movement of the wheel support unit it comes to a standstill; and A comparative measurement of the oscillation amplitude measured between measurement points C and D with the oscillation amplitude of a reference shock absorber.

Using this process, the resonance range of the wheel support and thus the operating point of the shock absorbers on the vehicle which contains the most useful information regarding the performance is extracted by filtering from the rest of the oscillation spectrum by spreading, or separating, the deceleration between measurement points B and C. The measurement made between measurement points B–C and C–D are used to make the result more reliable. In effect, two measurements are taken within the measurement cycle. The amplitude of the oscillation movement can be measured correctly as a result of this spread, or expanded, measurement, since the wheel support can be more easily set to the respective oscillation frequency. In comparison to known devices and processes, the invention makes it possible to significantly increase the accuracy of the measurement. The oscillation amplitudes therefore correspond with sufficient precision to the measurements which are made on a shock absorber measurement machine like the ones used in the automobile industry.

In one consistent refinement of the process, the deceleration of the oscillation frequency is continued after the limit value of the faded resonance frequency at measurement point C to a limit value C1, below which there are no further resonance frequencies, an increase of the oscillation frequency to a measurement point C2 which lies in the frequency range of the measurement point C, and a further increase of the oscillation frequency to the measurement point D. When amateur or do-it-yourself mechanics equip their vehicles with shock absorbers which are inappropriate to the vehicle in question, it can happen that the oscillations from the vehicle body (e.g., the engine and transmission mountings) will generate additional resonance frequencies which differ from the resonance frequencies of the wheel support. As a result of the additional measurement point C1, these additional resonance frequencies can also be taken into consideration.

To make the process attractive to service technicians in terms of the time required to carry it out, the increase of the oscillation frequency between measurement points C1 and C2 is more rapid than the deceleration and increase of the oscillation frequency between the measurement points B and C and C2 and D, respectively. Moreover, the reduction of the oscillation frequency, starting from measurement point B, is continued to a greater extent than the increase of the oscillation frequency between points C or C2 and D2. Starting from measurement point B, all that needs to be determined is whether there is a resonance frequency. Between the measurement points C and C2 and D, an exact determination can be made by a particularly pronounced spreading, or separation, of the measurement cycle. Against the same background, the measurement point A lies below an oscillation frequency of 10 Hz. The previously required accelerations to an oscillation frequency of 15 Hz are no longer necessary.

In summary, one aspect of the invention resides broadly in a process for the in situ testing of the performance of at least one shock absorber being tested by comparison to the performance characteristics of a reference shock absorber, the at least one shock absorber being tested being mounted on a wheel of a vehicle during the testing process and the at least one shock absorber having at least one resonant frequency, the vehicle including the wheel, the at least one shock absorber being tested mounted on the wheel and a vehicle body, the process comprising the steps of: providing a wheel support member, providing means for oscillating the wheel support member over a range of oscillation frequencies, disposing the wheel of the vehicle on the wheel support member, oscillating the wheel support member at an oscillation frequency, sensing the induced oscillations of at least one of the vehicle body and the wheel during at least a portion of the step of oscillating the wheel support member, increasing the oscillation frequency of the wheel support member up to a first oscillation frequency at a measurement point A, the first oscillation frequency being greater than the at least one resonant oscillation frequency of the at least one shock absorber being tested, maintaining the oscillation frequency of the wheel support member at the first oscillation frequency until a measurement point B, at which the induced oscillations of the wheel are substantially about matched to the first oscillation frequency, decreasing the oscillation frequency of the wheel support member to a second oscillation frequency at a measurement point C, at which the sensed induced oscillations of the vehicle body are less than a first determined value, the second oscillation frequency being substantially less than the at least one resonant frequency of the at least one shock absorber being tested, increasing the oscillation frequency of the wheel support member to a third oscillation frequency at a measurement point D, at which the sensed induced oscillations of the vehicle body are less than a second determined value, and comparing the sensed induced oscillations of the vehicle including the at least one shock absorber being tested between at least the measurement points C and D to the reference oscillations between at least the measurement points C and D of the reference shock absorber.

Another aspect of the invention resides broadly in a shock absorber testing device for the in situ testing of the performance of at least one shock absorber being tested by comparison to the performance characteristics of a reference shock absorber, the at least one shock absorber being tested being mounted on a wheel of a vehicle during the testing process and having at least one resonant frequency, the vehicle including the wheel, the at least one shock absorber being tested mounted on the wheel and a vehicle body, the shock absorber testing device comprising: wheel support means for receiving and supporting the wheel of the vehicle, oscillation means for oscillating the wheel support means at an oscillation frequency within a range of oscillation frequencies, the range of oscillation frequencies including the at least one resonant oscillation frequency of the at least one shock absorber being tested, sensing means for sensing the induced oscillations of at least one of the vehicle body and the wheel during at least a portion of the oscillation of the wheel support member, and control means for determining the controlling the oscillation of the wheel support means, the control means comprising: means for increasing the oscillation frequency of the wheel support member up to a first oscillation frequency at a measurement point A, the first oscillation frequency being greater than the at least one resonant oscillation frequency of the at least one shock absorber being tested, means for maintaining the oscillation frequency of the wheel support member at the first oscillation frequency until a measurement point B, at which the induced oscillations of the wheel are substantially about matched to the first oscillation frequency, means for decreasing the oscillation frequency of the wheel support member to a second oscillation frequency at a measurement point C, at which the sensed induced oscillations of the vehicle body are less than a first determined value, the second oscillation frequency being substantially less than the at least one resonant frequency of the at least one shock absorber being tested, means for increasing the oscillation frequency of the wheel support member to a third oscillation frequency at a measurement point D, at which the sensed induced oscillations of the vehicle body are less than a second determined value, and means for comparing the sensed induced oscillations of the vehicle including the at least one shock absorber being tested between at least the measurement points C and D to the reference oscillations between at least the measurement points C and D of the reference shock absorber.

A further aspect of the invention resides broadly in a process for the in situ testing of the performance of at least one shock absorber being tested by comparison to the performance characteristics of a reference shock absorber, the at least one shock absorber being tested being mounted on a wheel of a vehicle during the testing process and having at least one resonant frequency, the vehicle including the wheel, the at least one shock absorber being tested mounted on the wheel and a vehicle body, the vehicle being positioned on a shock absorber testing device during the testing process, the shock absorber testing device comprising: wheel support means for receiving and supporting the wheel of the vehicle, oscillation means for oscillating the wheel support means at an oscillation frequency within a range of oscillation frequencies, the range of oscillation frequencies including the at least one resonant oscillation frequency of the at least one shock absorber being tested, sensing means for sensing the induced oscillations of at least one of the vehicle body and the wheel during at least a portion of the oscillation of the wheel support member, and control means for determining the controlling the oscillation of the wheel support means, the control means comprising: means for increasing the oscillation frequency of the wheel support member up to a first oscillation frequency at a measurement point A, the first oscillation frequency being greater than the at least one resonant oscillation frequency of the at least one shock absorber being tested, means for maintaining the oscillation frequency of the wheel support member at the first oscillation frequency until a measurement point B, at which the induced oscillations of the wheel are substantially about matched to the first oscillation frequency, means for decreasing the oscillation frequency of the wheel support member to a second oscillation frequency at a measurement point C, at which the sense induced oscillations of the vehicle body are less than a first determined value, the second oscillation frequency being substantially less than the at least one resonant frequency of the shock absorber being tested, means for increasing the oscillation frequency of the wheel support member to a third oscillation frequency at a measurement point D, at which the sensed induced oscillations of the vehicle body are less than a second determined value, and means for comparing the sensed induced oscillations of the vehicle including the at least one shock absorber being tested between at least the measurement points C and D to the reference oscillations between at least the measurement points C and D of the reference shock absorber, the process comprising the steps of: disposing the wheel of the vehicle on the wheel support means, oscillating the wheel support means at an oscillation frequency, sensing the induced oscillations of at least one of the vehicle body and the wheel during at least a portion of the step of oscillating the wheel support means, increasing the oscillation frequency of the wheel support means up to a first oscillation frequency at a measurement point A, the first oscillation frequency being greater than the at least one resonant oscillation frequency of the at least one shock absorber being tested, maintaining the oscillation frequency of the wheel support means at the first oscillation frequency until a measurement point B, at which the induced oscillations of the wheel are substantially about matched to the first oscillation frequency, decreasing the oscillation frequency of the wheel support means to a second oscillation frequency at a measurement point C, at which the sensed induced oscillations of the vehicle body are less than a first determined value, the second oscillation frequency being substantially less than the at least one resonant frequency of the at least one shock absorber being tested, increasing the oscillation frequency of the wheel support means to a third oscillation frequency at a measurement point D, at which the sensed induced oscillations of the vehicle body are less than a second determined value, and comparing the sensed induced oscillations of the vehicle including the at lest one shock absorber being tested between at least the measurement points C and D to the reference oscillations between at least the measurement points C and D of the reference shock absorber.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintain that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is explained below in greater detail with reference to the accompanying drawings, wherein.

DESCRIPTION OF THE PREFERRED EMBODIMENTS

Figure 1:
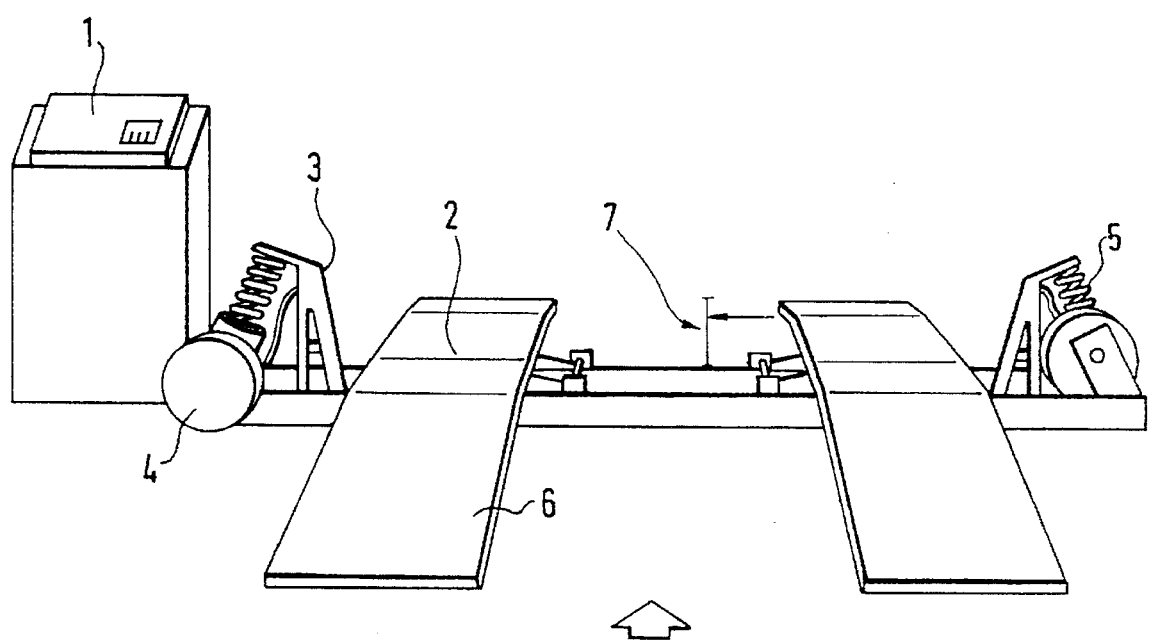
FIG. 1 is a perspective view showing the construction of the inventive shock absorber test device.

FIG. 1 illustrates a shock absorber test device constructed according to the invention which operates according to the principle of resonance measurement. The electric power supply and the device in general are controlled by means of a control stand, or control unit, 1 which also preferably contains, for example, devices to input data, to display the results, and a printer to print out the test report. The shock absorber test device consists of, among other things, a steel frame with wheel supports 2 which are connected by means of oscillating cranks 3 with a drive unit 4, which preferably consists of a frequency controlled motor which makes possible a continuous adjustment of the speed of rotation of the drive unit 4 and, therefore, the frequency of oscillation.

The wheel supports 2 are preferably sized so that all types of passenger automobiles and small trucks can be tested.

Each of the oscillating cranks 3 preferably operates independently of the other. A spring 5 which has a low spring constant and which is located between the oscillating cranks 3 and the drive unit 4 is designed to minimize the influence of the natural suspension characteristics of the tires. This measure prevents the car from lifting off the supports when large resonance amplitudes occur.

Figure 2:
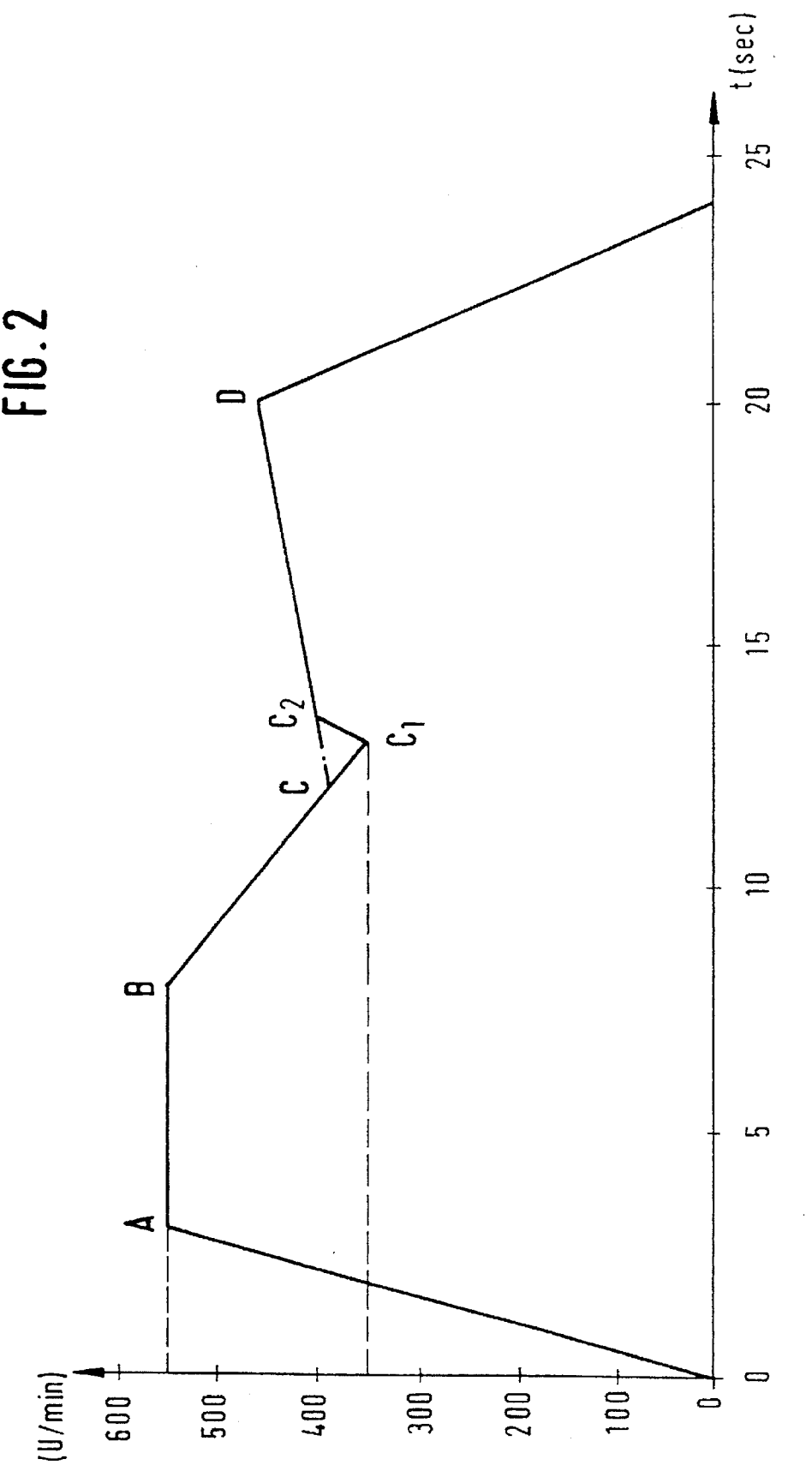
FIG. 2 is a graph of the measurement cycle of the inventive process.

For test purposes, the vehicle is run by means of approach ramps 6 with one axle onto the wheel supports 2. The wheel supports 2 interact with distance sensors 7 which measure the oscillation amplitude. Then the drive unit 4 is turn on, which accelerates each of the wheel supports 2 to a measurement point A in an oscillation range which is above the resonance frequency of the wheel, and remains in this oscillating condition until the wheel has correctly matched the oscillations of the wheel support 2 at measurement point B. This speed-up process occurs very rapidly, in particular because the speed of rotation at the oscillation measurement point A need not be any higher than approximately 600 rpm=10 Hz. The matching of the oscillations of the wheels and wheel supports 2 takes only a few seconds, as can be seen in FIG. 2. Then the oscillation frequency is relatively slowly reduced, with a simultaneous measurement and storage of the oscillation amplitude to a reverse oscillation amplitude at measurement point C, at which, as the oscillation frequency was being reduced, the oscillation amplitude fell below a first limit value which serves as an indicator of a faded resonance frequency. The resonance frequency of the shock absorber is in the oscillation range B-C. Starting from the measurement point C, the oscillation frequency is slowly and steadily increased, whereby also simultaneously, the oscillation amplitude is measured and stored to a measurement point D, at which the oscillation amplitude has fallen below a second limit value, e.g., less than 2 mm, which serves as an indicator of a faded resonance frequency. If the same basic cycle of measurement points is used, the slow increase of the oscillation frequency results in a spreading, or separation, of the measurement. This spreading makes it possible for the shock absorber to match the oscillating frequency of the respective excitation frequency, with the result that the oscillation amplitudes are particularly pronounced and can be measured very accurately. The wheel support 2 is then decelerated until it comes to a stop.

The oscillation amplitude measured between measurement points C and D is compared to the oscillation amplitude of a reference shock absorber, so that after the process has been completed, it is possible to reach a qualitative conclusion concerning the damping capabilities of the shock absorber being tested.

The process described above can be expanded by continuing the deceleration of the oscillation frequency after the limit value of the faded resonance frequency at measurement point C, to a limit value C1, below which there are no additional resonance frequencies, a rapid increase of the oscillation frequency to a measurement point C2, which lies in the frequency range of the measurement point C, and a further slow increase of the oscillation frequency to the measurement point D. It can be essentially guaranteed to an even greater extent that no further resonance frequencies will occur. The delay which occurs between the measurement points C–C1 is offset by a rapid run-up to measurement point C2, which means that there are no disadvantages in terms of the time it takes to carry out the process.

After the process has been completed, the comparative result is preferably displayed and printed out for the customer on a printer preferably included in the control stand 1.

Referring again to FIGS. 1 and 2, in one embodiment of the invention, the frequency of the oscillation imparted to the wheel supports 2 by the drive unit 4 through the oscillating cranks 3 and the springs 5 and controlled by the control stand, or control unit, 1 (which may preferably incorporate a control unit of a type well known in the art, e.g., a microprocessor, for controlling the speed of the drive unit 4 and for stepping the drive unit 4 through a series of controlled speeds to produce the defined oscillations shown in FIG. 2) is initially ramped up to a first oscillation frequency at the measurement point A, this first oscillation frequency being above the resonant oscillation frequency of the shock absorber being tested. The oscillation frequency of the wheel supports 2 is maintained at this first elevated oscillation frequency for a period of time (until measurement point B) sufficient to ensure that the oscillation frequency of the wheels of the vehicle are substantially matched to this first oscillation frequency, that is, to ensure that any transient responses due perhaps to the resiliency of the tires has passed.

From the measurement point B, the oscillation frequency of the wheel support 2 is preferably steadily decreased, and the oscillations induced in the vehicle body of the vehicle are sensed by the sensors 7 and communicated to the control unit 1 which monitors, e.g., by storing in memory, the oscillations induced in the vehicle body. As the oscillation frequency is decreased from measurement point B to measurement point C, the frequency of oscillation will pass through the resonant oscillation frequency of the shock absorber being tested, resulting in pronounced induced oscillations in the vehicle body, which will decay or fade as the oscillation frequency of the wheel stands 2 falls below the resonant oscillation frequency of the shock absorber being tested. When the induced oscillations of the vehicle body have fallen below a first limiting value, that is, a measurement point C, wherein the frequency of oscillation of the wheel stands 2 are at a second oscillation frequency, the control unit 1 causes the oscillation frequency of the wheel stands 1 to be increased, and the induced oscillations of the vehicle body are measured by the sensors 7 and stored, e.g., in memory, by control unit 1. Preferably, the oscillation frequency of the wheel stands 2, and therefore, the oscillation frequency transmitted to the wheels of the vehicle are increased up to a third oscillation frequency at measurement point D, which is above the resonant oscillation frequency of the shock absorber being tested. Therefore, the shock absorber being tested passes through its critical resonant frequency range and the oscillations which are induced in the vehicle body, measured by the sensors 7 and stored by the control unit 1 are indicative of the current performance characteristics of the shock absorber being tested. When the induced oscillations of the vehicle body have fallen below a second limiting value of measurement point D, indicating that the resonant frequency range of the shock absorber being tested has now been exceeded, the oscillation frequency of the wheel supports 2 is at a third oscillation frequency. The oscillation frequency of the wheel supports 2 is now decreased to zero.

The oscillations induced in the vehicle body between at least measurement points C and D, and passing through the resonant frequency range of the shock absorber being tested, which are preferably stored in memory in the control unit 1 are now compared to the oscillations induced using a reference shock absorber. The reference oscillations of the reference shock absorber or a characteristic thereof may also be stored in the memory of the control unit 1, and a comparison may be directly made by the control unit 1, and an indication given as to whether the performance characteristic of the shock absorber being tested is acceptable.

On alternative embodiment of the invention is directed to the situation wherein the vehicle may exhibit other resonant frequencies beyond the resonant frequency of the shock absorber being tested, due to, for example, improper matching of motor mounts and shock absorbers, etc. In this embodiment, from the second oscillation frequency at measurement point B, the oscillation frequency is decreased to a fourth oscillation frequency at measurement point C1, which is at least as low as any detected resonant frequencies of the vehicle. The oscillation frequency is thereafter relatively rapidly increased to a fifth oscillation frequency at a measurement point C2, which is in the range of the above-discussed second oscillation frequency, and the oscillation frequency in thereafter increased in the same manner as discussed above to the third oscillation frequency at the measurement point D. This embodiment of the invention ensures that all of the resonant frequencies of the vehicle are accounted for.

Figure 3:
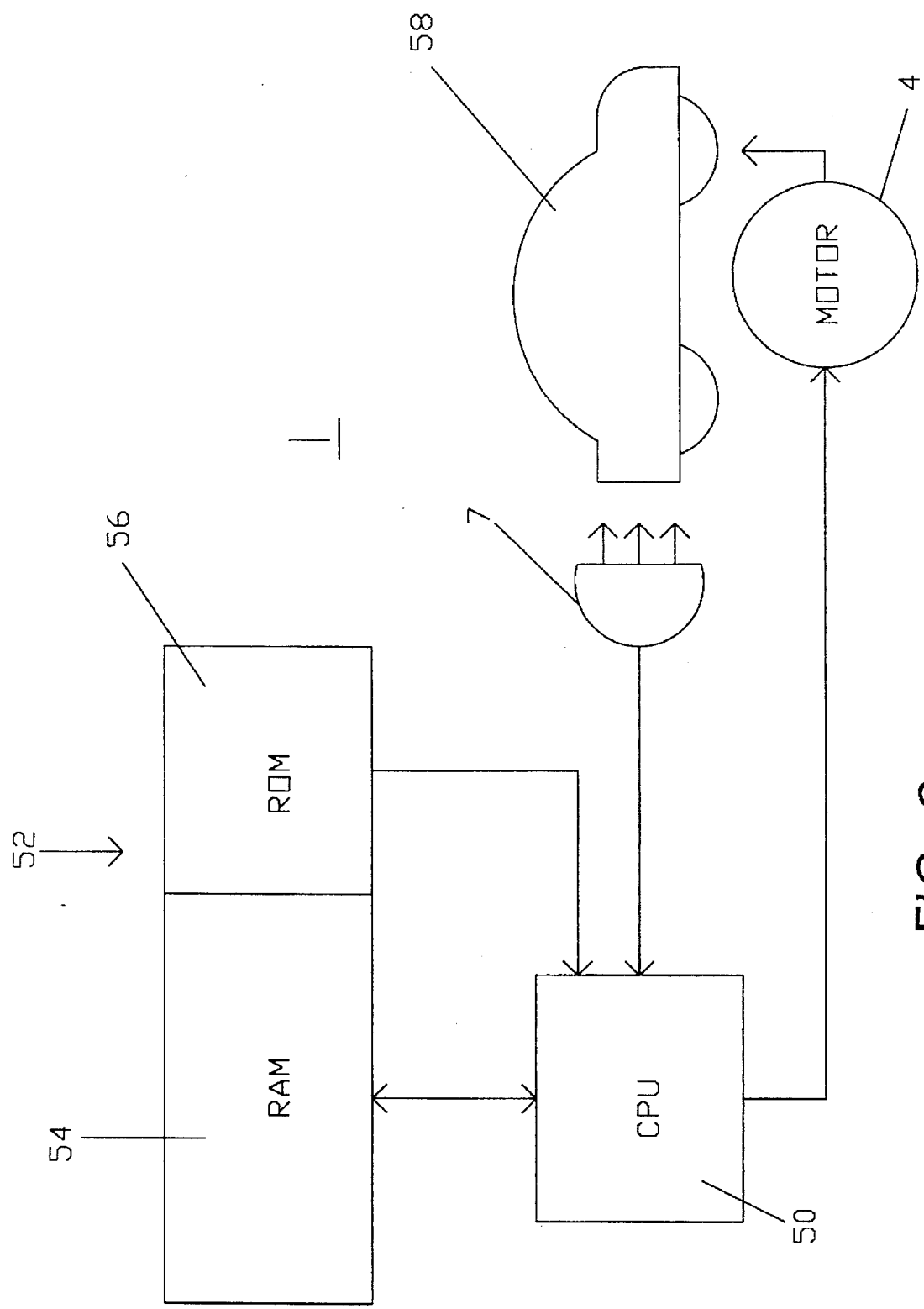
FIG. 3 is a schematic illustration of a control unit employed in the invention.

FIG. 3 is a schematic illustration of one embodiment of the control unit 1 of the shock absorber testing device shown in FIG. 1. The control unit 1 generally includes a microprocessor or CPU 50 with memory 52 associated therewith, for example, dynamic random access memory (RAM) 54 and read only memory (ROM) 56. The CPU 50 controls the speed of the motor or drive unit 4 which translates rotational movement of the motor into the oscillation frequency of the wheel supports 2, and the CPU 50 receives from the sensors 7 signals indicative of the oscillations induced in the vehicle body 58. The CPU 50 can, for example, run instructions stored in the ROM memory 56 and store the results, e.g., the amplitudes of the oscillations induced in the vehicle body 58 in the RAM memory 54, for comparison to the characteristics of the reference shock absorber stored, for example, in the ROM memory 56.

One feature of the invention resides broadly in the process for verifying the performance of a shock absorber by means of a shock absorber testing device comprising at least one adjustable drive unit for a wheel support which can be set in oscillation, and electronic units which measure and evaluate the oscillating movement of the suspended vehicle with the following process steps:

acceleration of the wheel support 2 by the drive unit 4 to an oscillation measurement point A in an oscillation range above the resonance frequency of the wheel, and maintenance of the wheel support in this oscillating condition, until at measurement point B, the wheel has matched the oscillation frequency of the wheel support with sufficient accuracy;

a delayed reduction of the oscillation frequency with simultaneous measurement and storage of the oscillation amplitude to a reverse oscillation frequency at measurement point C, at which, during the reduction of the oscillation frequency, the oscillation amplitude has fallen below a first limit value which is considered an indicator for the faded, or decayed, resonance frequency;

an increase in the oscillation frequency with simultaneous measurement and storage of the oscillation amplitude to a measurement point D, at which the oscillation amplitude has fallen below a second limit value which serves as an indicator for a faded resonance frequency;

a deceleration of the oscillation movement of the wheel support until it comes to a standstill; and a comparative measurement of the oscillation amplitude measured between measurement points C and D with an oscillation amplitude of a reference shock absorber.

Another feature of the invention resides broadly in the process characterized by the fact that the deceleration of the oscillation frequency is continued after the limit value of the faded resonance frequency at measurement point C, to a limit value C1, below which there are no additional resonance frequencies, an increase of the oscillation frequency to a measurement point C2 which lies in the frequency range of the measurement point C, and a further increase of the oscillation frequency to measurement point D.

Yet another feature of the invention resides broadly in the process characterized by the fact that the increase of the oscillation frequency between measurement points C1 and C2 proceeds more rapidly than the deceleration and increase of the oscillation frequency between measurement points B and C or C2 and D respectively.

Still another feature of the invention resides broadly in the process characterized by the fact that the reduction of the oscillation frequency, starting from measurement point B, is continued to a greater extent than the increase of the oscillation frequency between measurement point C or C2 and D.

A further feature of the invention resides broadly in the process characterized by the fact that measurement point A is below an oscillation frequency of 10 Hz.

Some examples of frequency controlled motors which may be used in conjunction with the present invention are to be found in U.S. Pat. No. 5,202,596, issued to Jensen on Apr. 13, 1993, and entitled "Electric Motor"; U.S. Pat. No. 5,204,601, issued to Hirata on Apr. 20, 1993, and entitled "Motor Control Servo System"; and U.S. Pat. No. 5,264,773, issued to Koyama on Nov. 23, 1993, and entitled "Controller for Induction Motor", each of the above U.S. patents being hereby expressly incorporated by reference herein.

Some examples of microprocessor controlled motors which may be used in conjunction with the present invention are to be found in U.S. Pat. No. 5,200,684, issued to Fisher on Apr. 6, 1993, and entitled "Electrical Motor Monitoring System for a Domestic Appliance"; U.S. Pat. No. 5,206,572, issued to Farag on Apr. 27, 1993, and entitled "Motor Controller"; U.S. Pat. No. 5,245,380, issued to Yang on Sep. 14, 1993, and entitled "Shutter and Iris Combined Automatic Exposure Device"; and U.S. Pat. No. 5,268,836, issued to Eckert, et al. on Dec. 7, 1993, and entitled "Mailing Machine Including Printing Drum Deceleration and Coasting Control System", each of the above U.S. patents being hereby expressly incorporated by reference herein.

Some examples of distance sensing apparatuses which may be employed for the sensors 7 described above are to be found in U.S. Pat. No. 5,179,286, issued to Akasu on Jan. 12, 1993, and entitled "Distance Measuring Apparatus Receiving Echo Light Pulses"; U.S. Pat. No. 5,180,922, issued to Hug on Jan. 19, 1993, and entitled "Distance Measuring Apparatus with phase detection"; U.S. Pat. No. 5,189,462, issued to Nakajima on Feb. 23, 1993, and entitled "Range Meter for Camera", U.S. Pat. No. 5,191,384, issued to Nakanishi on Mar. 2, 1993, and entitled "Distance Measuring System"; U.S. Pat. No. 5,220,177, issued to Harris on Jun. 15, 1993, and entitled "Method and Apparatus for Edge Detection and Location"; and U.S. Pat. No. 5,229,836, issued on Nagano on Jul. 20, 1993, and entitled "Position Detecting Apparatus for a Moving Body", each of the above U.S. patents being hereby expressly incorporated by reference herein.

The above-described German Utility Model No. 93 03 201 describing another shock absorber testing device is additionally hereby expressly incorporated by reference herein.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 195 19 136.6, filed on May 30, 1995, having inventors Frank Ilzig and Norbert Omlor, and DE-OS 195 19 136.6 and DE-PS 195 19 136.6, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claim to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A process for the in situ testing of the performance of at least one shock absorber being tested by comparison to the performance characteristics of a reference shock absorber, said at least one shock absorber being tested being mounted on a wheel of a vehicle during said testing process and said at least one shock absorber having at least one resonant frequency, said vehicle including said wheel, said at least one shock absorber being tested mounted on said wheel and a vehicle body, said process comprising the steps of:

providing a wheel support member;

providing means for oscillating said wheel support member over a range of oscillation frequencies;

disposing said wheel of said vehicle on said wheel support member;

oscillating said wheel support member at an oscillation frequency;

sensing the induced oscillations of at least one of said vehicle body and said wheel during at least a portion of said step of oscillating said wheel support member;

increasing said oscillation frequency of said wheel support member up to a first oscillation frequency at a measurement point A, said first oscillation frequency being greater than said at least one resonant oscillation frequency of said at least one shock absorber being tested;

maintaining said oscillation frequency of said wheel support member of said first oscillation frequency until a measurement point B, at which the induced oscillations of said wheel are substantially about matched to said first oscillation frequency;

decreasing said oscillation frequency of said wheel support member to a second oscillation frequency at a measurement point C, at which said sensed induced oscillations of said vehicle body are less than a first determined value, said second oscillation frequency being substantially less than said at least one resonant frequency of said at least one shock absorber being tested;

increasing said oscillation frequency of said wheel support member to a third oscillation frequency at a measurement point D, at which said sensed induced oscillations of said vehicle body are less than a second determined value; and comparing said sensed induced oscillations of said vehicle including said at least one shock absorber being tested between at least said measurement points C and D to the reference oscillations between at least said measurement points C and D of said reference shock absorber.

2. A process for the in situ testing of the performance of at least one shock absorber being tested according to claim 1, wherein the absolute value of the decrease of said oscillation frequency from said first oscillation frequency to said second oscillation frequency between said measurement points B and C is greater than the absolute value of the increase of said oscillation frequency from said second oscillation frequency to said third oscillation frequency between said measurement points C and D.

3. A process for the in situ testing of the performance of at least one shock absorber being tested according to claim 1, wherein said first oscillation frequency is less than 10 Hz.

4. A process for the in situ testing of the performance of at least one shock absorber being tested according to claim 1, wherein said third oscillation frequency is substantially greater than said at least one resonant frequency of said at least one shock absorber being tested.

5. A process for the in situ testing of the performance of at least one shock absorber being tested according to claim 1, wherein said vehicle, including said wheel, said at least one shock absorber being tested mounted on said wheel and said vehicle body, has at least one additional resonant frequency in addition to said at least one resonant frequency of said at least one shock absorber being tested, and wherein said process additionally comprises the further steps of:

decreasing said oscillation frequency of said wheel support below said second oscillation frequency at said measurement point C to a fourth oscillation frequency at a measurement point C1, said fourth oscillation frequency at said measurement point C1 being less than said second oscillation frequency at said measurement point C, and said fourth oscillation frequency at said measurement point C1 being less than or equal to said at least one additional resonant frequency;

increasing said oscillation frequency of said wheel support to a fifth oscillation frequency at a measurement point C2, said fifth oscillation frequency at said measurement point C2 being substantially in the range of said second oscillation frequency at said measurement point C; and thereafter, increasing said oscillation frequency of said wheel support to said third oscillation frequency at said measurement point D, at which said sensed induced oscillations of said vehicle body are less than said second determined value.

6. A process for the in situ testing of the performance of at least one shock absorber being tested according to claim 5, wherein the rate of increase of said oscillation frequency with respect to time between said measurement points C1 and C2 is greater than the rate of decrease of said oscillation frequency with respect to time between said measurement points B and C.

7. A process for the in situ testing of the performance of at least one shock absorber being tested according to claim 6, wherein the rate of increase of said oscillation frequency with respect to time between said measurement points C1 and C2 is greater than the rate of increase of said oscillation frequency with respect to time between said measurement points C2 and D.

8. A process for the in situ testing of the performance of at least one shock absorber being tested according to claim 5, wherein the rate of increase of said oscillation frequency with respect to time between said measurement points C1 and C2 is greater than the rate of increase of said oscillation frequency with respect to time between said measurement points C2 and D.

9. A process for the in situ testing of the performance of at least one shock absorber being tested according to claim 5, wherein the absolute value of the decrease of said oscillation frequency from said first oscillation frequency to said fourth oscillation frequency between said measurement points B and C2 is greater than the absolute value of the increase of said oscillation frequency from said fourth oscillation frequency to said third oscillation frequency between said measurement points C2 and D.

10. A process for the in situ testing of the performance of at least one shock absorber being tested according to claim 5, wherein said third oscillation frequency is substantially greater than said at least one resonant frequency of said at least one shock absorber being tested.

11. A shock absorber testing device for the in situ testing of the performance of at least one shock absorber being tested by comparison to the performance characteristics of a reference shock absorber, said at least one shock absorber being tested being mounted on a wheel of a vehicle during said testing process and having at least one resonant frequency, said vehicle including said wheel, said at least one shock absorber being tested mounted on said wheel and a vehicle body, said shock absorber testing device comprising:

wheel support means for receiving and supporting said wheel of said vehicle;

oscillation means for oscillating said wheel support means at an oscillation frequency within a range of oscillation frequencies, said range of oscillation frequencies including said at least one resonant oscillation frequency of said at least one shock absorber being tested;

sensing means for sensing the induced oscillations of at least one of said vehicle body and said wheel during at least a portion of said oscillation of said wheel support member; and control means for determining and controlling said oscillation of said wheel support means, said control means comprising:

means for increasing said oscillation frequency of said wheel support member up to a first oscillation frequency at a measurement point A, said first oscillation frequency being greater than said at least one resonant oscillation frequency of said at least one shock absorber being tested;

means for maintaining said oscillation frequency of said wheel support member at said first oscillation frequency until a measurement point B, at which the induced oscillations of said wheel are substantially about matched to said first oscillation frequency;

means for decreasing said oscillation frequency of said wheel support member to a second oscillation frequency at a measurement point C, at which said sensed induced oscillations of said vehicle body are less than a first determined value, said second oscillation frequency being substantially less than said at least one resonant frequency of said at least one shock absorber being tested;

means for increasing said oscillation frequency of said wheel support member to a third oscillation frequency at a measurement point D, at which said sensed induced oscillations of said vehicle body are less than a second determined value; and means for comparing said sensed induced oscillations of said vehicle including said at least one shock absorber being tested between at least said measurement points C and D to the reference oscillations between at least said measurement points C and D of said reference shock absorber.

12. A shock absorber testing device for the in situ testing of the performance of at least one shock absorber being tested according to claim 11, wherein said vehicle, including said wheel, said at least one shock absorber being tested mounted on said wheel and said vehicle body, has at least one additional resonant frequency in addition to said at least one resonant frequency of said at least one shock absorber being tested, and wherein said shock absorber testing apparatus additionally comprises:

means for decreasing said oscillation frequency of said wheel support below said second oscillation frequency at said measurement point C to a fourth oscillation frequency at a measurement point C1, said fourth oscillation frequency at said measurement point C1 being less than said second oscillation frequency at said measurement point C, and said fourth oscillation frequency at said measurement point C1 being less than or equal to said at least one additional resonant frequency;

means for increasing said oscillation frequency of said wheel support to a fifth oscillation frequency at a measurement point C2, said fifth oscillation frequency at said measurement point C2 being substantially in the range of said second oscillation frequency at said measurement point C; and means for, thereafter, increasing said oscillation frequency of said wheel support to said third oscillation frequency at said measurement point D, at which said sensed induced oscillations of said vehicle body are less than said second determined value.

13. A shock absorber testing device for the in situ testing of the performance of at least one shock absorber being tested according to claim 12, wherein the rate of increase of said oscillation frequency with respect to time between said measurement points C1 and C2 is greater than the rate of decrease of said oscillation frequency with respect to time between said measurement points B and C.

14. A shock absorber testing device for the in situ testing of the performance of at least one shock absorber being tested according to claim 13, wherein the rate of increase of said oscillation frequency with respect to time between said measurement points C1 and C2 is greater than the rate of decrease of said oscillation frequency with respect to time between said measurement points C2 and D.

15. A shock absorber testing device for the in situ testing of the performance of at least one shock absorber being tested according to claim 12, wherein the absolute value of the decrease of said oscillation frequency from said first oscillation frequency to said fourth oscillation frequency between said measurement points B and C2 is greater than the absolute value of the increase of said oscillation frequency from said fourth oscillation frequency to said third oscillation frequency between said measurement points C2 and D.

16. A shock absorber testing device for the in situ testing of the performance of at least one shock absorber being tested according to claim 12, wherein said third oscillation frequency is substantially greater than said at least one resonant frequency of said at least one shock absorber being tested.

17. A shock absorber testing device for the in situ testing of the performance of at least one shock absorber being tested according to claim 11, wherein the absolute value of the decrease of said oscillation frequency from said first oscillation frequency to said fourth oscillation frequency between said measurement points B and C is greater than the absolute value of the increase of said oscillation frequency from said second oscillation frequency to said third oscillation frequency between said measurement points C and D.

18. A shock absorber testing device for the in situ testing of the performance of at least one shock absorber being tested according to claim 11, wherein said first oscillation frequency is less than 10 Hz.

19. A shock absorber testing device for the in situ testing of the performance of at least one shock absorber being tested according to claim 11, wherein said third oscillation frequency is substantially greater than said at least one resonant frequency of said at least one shock absorber being tested.

20. A process for the in situ testing of the performance of at least one shock absorber being tested by comparison to the performance characteristics of a reference shock absorber, said at least one shock absorber being tested being mounted on a wheel of a vehicle during said testing process and having at least one resonant frequency, said vehicle including said wheel, said at least one shock absorber being tsted mounted on said wheel and a vehicle body, said vehicle being positioned on a shock absorber testing device during said testing process, said shock absorber testing device comprising:

wheel support means for receiving and supporting said wheel of said vehicle;

oscillation means for oscillating said wheel support means at an oscillation frequency within a range of oscillation frequencies, said range of oscillation frequencies including said at least one resonant oscillation frequency of said at least one shock absorber being tested;

sensing means for sensing the induced oscillations of at least one of said vehicle body and said wheel during at least a portion of said oscillation of said wheel support member; and control means for determining and controlling said oscillation of said wheel support means, said control means comprising:

means for increasing said oscillation frequency of said wheel support member up to a first oscillation frequency at a measurement point A, said first oscillation frequency being greater than said at least one resonant oscillation frequency of said at least one shock absorber being tested;

means for maintaining said oscillation frequency of said wheel support member at said first oscillation frequency until a measurement point B, at which the induced oscillations of said wheel are substantially about matched to said first oscillation frequency;

means for decreasing said oscillation frequency of said wheel support member to a second oscillation frequency at a measurement point C, at which said sensed induced oscillations of said vehicle body are less than a first determined value, said second oscillation frequency being substantially less than said at least one resonant frequency of said shock absorber being tested;

means for increasing said oscillation frequency of said wheel support member to a third oscillation frequency at a measurement point D, at which said sensed induced oscillations of said vehicle body are less than a second determined value; and means for comparing said sensed induced oscillations of said vehicle including said at least one shock absorber being tested between at least said measurement point C and D to the reference oscillations between at least said measurement points C and D of the reference shock absorber;

said process comprising the steps of:

disposing said wheel of said vehicle on said wheel support means;

oscillating said wheel support means at an oscillation frequency;

sensing the induced oscillations of at least one of said vehicle body and said wheel during at least a portion of said step of oscillating said wheel support means;

increasing said oscillation frequency of said wheel support means up to a first oscillation frequency at a measurement point A, said first oscillation frequency being greater than said at least one resonant oscillation frequency of said at least one shock absorber being tested;

maintaining said oscillation frequency of said wheel support means at said first oscillation frequency until a measurement point B, at which the induced oscillations of said wheel are substantially about matched to said first oscillation frequency;

decreasing said oscillation frequency of said wheel support means to a second oscillation frequency at a measurement point C, at which said sensed induced oscillations of said vehicle body are less than a first determined value, said second oscillation frequency being substantially less than said at least one resonant frequency of said at least one shock absorber being tested;

increasing said oscillation frequency of said wheel support means to a third oscillation frequency at a measurement point D, at which said sensed induced oscillations of said vehicle body are less than a second determined value; and comparing said sensed induced oscillations of said vehicle including said at least one shock absorber being tested between at least said measurement points C and D to the reference oscillations between at least said measurement points C and D of said reference shock absorber.

* * * * *

UNITED STATES PATENT AND TRADEMARK OFFICE
CERTIFICATE OF CORRECTION

PATENT NO.   : 5,665,901
DATED        : September 9, 1997
INVENTOR(S)  : Frank ILZIG and Norbert OMLOR It is certified that error appears in the above-identified patent and that said Letters Patent is hereby corrected as shown below:

In column 3, line 2, after 'between' insert --the measurement--.

In column 6, line 24, after 'is', delete "turn" and insert --turned--.

In column 8, line 16, before 'alternative', delete "On" and insert --One--.

In column 14, line 31, Claim 17, after 'said', delete "fourth" and insert --second--.

In column 14, line 52, Claim 20, after 'being', delete "tsted" and insert --tested--.

Signed and Sealed this

Sixth Day of January, 1998

Attest:

BRUCE LEHMAN

*Attesting Officer*      *Commissioner of Patents and Trademarks*